United States Patent [19]

Yoshida et al.

[11] Patent Number: 5,616,783
[45] Date of Patent: Apr. 1, 1997

[54] PURIFICATION PROCESS OF POLYHYDROXYCARBOXYLIC ACID

[75] Inventors: Yasunori Yoshida, Kanagawa-ken; Katsuji Watanabe, Fukoka-ken; Shoji Obuchi; Masahiro Ohta, both of Kanagawa-ken, all of Japan

[73] Assignee: Mitsui Toatsu Chemicals, Inc., Tokyo, Japan

[21] Appl. No.: 535,638

[22] Filed: Sep. 28, 1995

[30] Foreign Application Priority Data

Oct. 13, 1994 [JP] Japan ................... 6-247881

[51] Int. Cl.$^6$ ................... C07C 67/48; C07C 67/58
[52] U.S. Cl. ................... 560/191; 528/495; 528/499
[58] Field of Search ................... 560/191; 528/495, 528/499

[56] References Cited

U.S. PATENT DOCUMENTS

| | | | |
|---|---|---|---|
| 4,810,775 | 3/1989 | Bendix et al. | 528/480 |
| 4,960,866 | 10/1990 | Bendix et al. | 528/499 |
| 5,264,491 | 11/1993 | Quirk | 525/177 |
| 5,310,865 | 5/1994 | Enomoto et al. | 528/361 |
| 5,324,798 | 6/1994 | Sanders et al. | 526/123 |

FOREIGN PATENT DOCUMENTS

| | | |
|---|---|---|
| 0591978 | 4/1994 | European Pat. Off. . |
| 4218268 | 12/1993 | Germany . |

*Primary Examiner*—Porfirio Nazario-Gonzalez
*Assistant Examiner*—Barbara S. Frazier
*Attorney, Agent, or Firm*—Burns, Doane, Swecker & Mathis

[57] ABSTRACT

A purification process for polyhydroxycarboxylic acids which comprises dissolving polyhydroxycarboxylic acid in an water-immiscible phenol or an organic solvent containing said water-immiscible phenol, successively bringing the resulting solution into contact with water which contains an acidic material, separating the organic layer from an aqueous layer, and isolating polyhydroxycarboxylic acid from the organic layer. The process can efficiently remove a catalyst contained in the polyhydroxycarboxylic acid prepared in the presence of the catalyst, does not require polyhydroxycarboxylic acid to be in the form of a solid, and can treat polyhydroxycarboxylic acid in a higher concentration as compared with using chlorinated hydrocarbon as a solvent.

4 Claims, No Drawings

PURIFICATION PROCESS OF POLYHYDROXYCARBOXYLIC ACID

BACKGROUND OF THE INVENTION

1) Field of the Invention

The present invention relates to a purification process of polyhydroxycarboxylic acid which is useful as a biodegradable polymer that can be substituted for conventional medical materials and general purpose resins.

2) Description of Related Art

Polyhydroxycarboxylic acid is excellent in mechanical, physical and chemical properties and additionally has a biodegradable function which can be degraded in the natural environment without giving a harmful effect on living organisms and is finally decomposed by microorganisms into carbon dioxide and water. Thus, polyhydroxycarboxylic acid plastics have recently received attention in various fields such as alternatives for medical materials and general purpose resins. Particularly, environmental issues are now closed-up and thus such plastics can conform to the needs of the era.

Generally, in the case of preparing polyhydroxycarboxylic acid by using hydroxycarboxylic acid such as lactic acid and glycolic acid as a raw material, polyhydroxycarboxylic acid can be obtained by conducting dehydration dimerization of hydroxycarboxylic acid and successively by subjecting the resultant cyclic dimer to ring-opening melt polymerization in the presence of a catalyst (for example, Sn-base catalyst). In the process, however, reaction procedures are complex and the polymer obtained becomes expensive. Additionally, the preparation process is melt polymerization and the polymerization product is pelletized as such. As a result, the product has a disadvantage that the catalyst used for the polymerization remains intact in the polyhydroxycarboxylic acid. Particularly, contamination of the catalyst into the product leads to a significant adverse effect depending upon the intended purpose of the polymer. For example, in the case of administering a slow-release drug to organisms, polyhydroxycarboxylic acid decomposes while the catalyst remains intact in the tissue of the organisms. Consequently, polyhydroxycarboxylic acid cannot be applied to such uses when the catalyst is toxic. Since the decomposition speed of polyhydroxycarboxylic acid differs depending upon the residual amount of the catalyst, the slow-release function of the drug cannot be fully exhibited. It has also been known that a large amount of the catalyst remaining in the polyhydroxycarboxylic acid leads to deterioration of properties in heat resistance test and weatherability test. Thus, impurities such as a catalyst which are contained in polyhydroxycarboxylic acid result in great restriction to the uses of the polymer.

On the other hand, it has been known a process for preparing polyhydroxycarboxylic acid in the absence of a catalyst such as the Sn-base catalyst. For example, a process for preparing a copolymer from glycolide and lactide in the presence of a strongly acidic ion exchange resin and a process for preparing a homopolymer or copolymer of lactic acid and glycolic acid by dehydration polycondensation in the absence of a catalyst, have been known. In any processes, however, the polymer obtained has a low molecular weight of 5,000–30,000, is unsatisfactory in light of its mechanical, physical and chemical properties, and thus is greatly restricted in uses.

U.S. Pat. No. 5,310,865 has disclosed a polymerization process for directly obtaining polyhydroxycarboxylic acid from hydroxycarboxylic acid or its oligomer by using a metal or metal compound of Sn, Ti or Ni as a catalyst, while removing formed water from the reaction system.

Polyhydroxycarboxylic acid having a sufficiently high molecular weight can also be obtained by the direct dehydration polymerization process. However, the catalyst used in the process remains in the product unless it is removed by some procedures and leads to the above problems.

In any case of preparing polyhydroxycarboxylic acid having a sufficiently high molecular weight, catalyst contamination is inevitable as mentioned above in the present state of the art unless successive purification is carried out.

Several processes have been known on the purification process for removing the catalyst in polyhydroxycarboxylic acid. For example, U.S. Pat. No. 4,960,866 has disclosed a process for once dissolving catalyst containing polyhydroxycarboxylic acid in a water-immiscible organic solvent, successively bringing the resulting solution into contact with an aqueous layer or water which contains inorganic acid, water-soluble organic acid or a water soluble complexing agent, separating the organic layer and isolating polyhydroxycarboxylic acid by a known process. U.S. Pat. No. 4,810,775 has described a purification process for dissolving catalyst containing polyhydroxycarboxylic acid in a good solvent and successively adding a precipitant in a turbulent shear field.

These processes can surely remove the catalyst from polyhydroxycarboxylic acid. However, these processes have the following problems in industry.

The process disclosed in U.S. Pat. No. 4,960,866 can be applied to any kind of polyhydroxycarboxylic acid. However, the catalyst removing efficiency of the process is not so good and thus the polyhydroxycarboxylic acid must be maintained at a low concentration in the solvent in order to obtain satisfactory efficiency for removing the catalyst, which leads to a problem of extremely poor volume efficiency. U.S. Pat. No. 4,960,866 has also described that halogenated hydrocarbon, for example, methylene chloride or chloroform can be preferably used as a solvent and that the concentration of polyhydroxycarboxylic acid in the solvent must be 10% or less. In the example, polyhydroxycarboxylic acid is treated by dissolving at a concentration of 1% in chloroform in order to satisfactorily remove the catalyst.

The process disclosed in U.S. Pat. No. 4,810,775 carries out precipitation and purification of polyhydroxycarboxylic acid at the same time and is simple as compared with the process of U.S. Pat. No. 4,960,866. However, the process of U.S. Pat. No. 4,810,775 has a problem of requiring specific facilities.

As mentioned above, any process has both merits and demerits, and a satisfactory purification process of polyhydroxycarboxylic acid has not yet been found.

SUMMARY OF THE INVENTION

One object of the invention is to provide a process for purifying high molecular weight polyhydroxycarboxylic acid efficiently in industry, with ease and also economically.

As a result of an intensive investigation in order to purify polyhydroxycarboxylic acid efficiently in industry, with ease and also economically, the present inventors have found that catalyst can be removed from polyhydroxycarboxylic acid efficiently by dissolving polyhydroxycarboxylic acid in a water-immiscible phenol or an organic solvent which contains said phenol, bringing the resulting solution into contact with water which contains an acidic material, successively separating an organic layer, and isolating polyhydroxycarboxylic acid from said organic layer, even though polyhydroxycarboxylic acid is dissolved in said solvent in a high concentration. Thus, the present invention has been completed.

That is, the aspect of the invention is a purification process of polyhydroxycarboxylic acid, comprising dissolving polyhydroxycarboxylic acid in a water-immiscible phenol or an organic solvent containing the water-immiscible phenol, successively bringing the resulting solution into contact with water which contains an acidic material, separating an organic layer, and isolating polyhydroxycarboxylic acid from the organic layer; and is polyhydroxycarboxylic acid obtained by said purification process.

DETAILED DESCRIPTION OF THE PREFERRED EMBODIMENTS

Exemplary water-immiscible phenols which can be used in the-invention include m-cresol, p-cresol, o-cresol, phenol, 2,4-xylenol, o-chlorophenol and p-chlorophenol. These phenols can be used as a mixture. These phenols can be used singly as a solvent, and can also be used combination with other organic solvents. No particular restriction is imposed upon the organic solvents for use in combination with these phenols so long as polyhydroxycarboxylic acid has high solubility in the organic solvents. These phenols can of course be used simultaneously with halogenated hydrocarbons described in U.S. Pat. No. 4,960,866.

Of course in the case of using these phenols singly, and even in the case of using these phenols in combination with other organic solvents, the invention can exhibit purification effect even though the viscosity of the polyhydroxycarboxylic acid solution is increased to some extent, so long as these phenols exist in the solvents in a below described amount or concentration.

The amount of phenols used is in the range of preferably 0.1–20 times by weight, more preferably 0.1–15 times by weight, most preferably 0.1–9 times by weight of the amount of polyhydroxycarboxylic acid. The catalyst removing effect can be sufficiently exhibited by using 0.1 times or more. In industry, use of 20 times or less is recommended in view of a polyhydroxycarboxylic acid concentration.

Phenols or an organic solvent containing phenol are used so as to obtain a polyhydroxycarboxylic acid concentration in the range of usually 1–30 wt %, preferably 5–20 wt %, more preferably 5–15 wt %, most preferably 10–15 wt %. The polyhydroxycarboxylic acid concentration of 1 wt % or more is suited in industry.

The polyhydroxycarboxylic acid concentration of 30 wt % or less can protect the solution from becoming too viscous depending upon the molecular weight of polyhydroxycarboxylic acid, and can prevent insolubility of polyhydroxycarboxylic acid which occurs in some cases by combination of monohydroxycarboxylic acid raw materials.

The purification process of the invention can be used for polyhydroxycarboxylic acid which was polymerized by various polymerization processes in the presence of a catalyst and has been isolated by known processes, or can be used, after polymerization, for the intact reaction mass of polyhydroxycarboxylic acid which contains polymerization solvents. No particular problem takes place even though in the presence of other organic solvents as polymerization solvents, for example, toluene, xylene, naphthalene, tetralin, biphenyl, anisole, phenetole, diphenyl ether, chlorobenzene, dichlorobenzene and chloronaphthalene as in the latter case.

Polyhydroxycarboxylic acid which can be used in the purification process of the invention is derived from aliphatic hydroxycarboxylic acid. Exemplary polyhydroxycarboxylic acid includes homopolymers and copolymers derived from glycolic acid, lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methyl-pentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, and 8-hydroxyoctanoic acid.

Some of these hydroxycarboxylic acids have an optically active carbon and exhibit morphology of D-, L- and D/L isomers. However, no particular restriction is imposed upon the morphology of the polyhydroxycarboxylic acid in the invention. Further, the polyhydroxycarboxylic acid can be a mixture. No particular limitation is put upon the composition of the polyhydroxycarboxylic acid.

The purification process of the invention can be used for both polyhydroxycarboxylic acid obtained by the direct dehydration polymerization process disclosed in U.S. Pat. No. 5,310,865 and polyhydroxycarboxylic acid obtained by melt polymerization through cyclic dimers of hydroxycarboxylic acid. No particular restriction is imposed upon the preparation process of polyhydroxycarboxylic acid.

Acidic materials which can be used in the invention include inorganic acids such as hydrochloric acid, sulfuric acid, nitric acid and phosphoric acid and organic acids such as acetic acid and p-toluenesulfonic acid. Hydrochloric acid, sulfuric acid and nitric acid are preferred in view of economy in particular.

The amount of acidic material is preferably 0.1–5.0 moles, more preferably 0.5–1 mole for 100 g of polyhydroxycarboxylic acid. The amount less than 0.1 mole is liable to decrease the effect for removing the catalyst. On the other hand, the amount greater than 5.0 moles leads to a problem of deteriorating polyhydroxycarboxylic acid. Further, use of the acidic material in excess has no effect on the catalyst removal and additionally excess purification is successively required for removing the acidic material.

The purification process of the invention brings an organic layer containing phenols which dissolve polyhydroxycarboxylic acid into contact with water which contains the acidic material. Stirring or shaking is a satisfactory method to make a sufficient contact of the organic layer with the aqueous layer. Uniflow or counter-current extraction is carried out in industry. Any process can be used so long as contact of the organic layer with the aqueous layer is satisfactory.

The temperature for bringing the organic layer into contact with the aqueous layer depends upon the stability of polyhydroxycarboxylic acid and is usually 0°–100° C. preferably 20°–60° C. The temperature lower than 0° C. increases viscosity of the polyhydroxycarboxylic acid solution, makes the solution difficult to handle, and additionally requires cooling capacity in excess. Thus preparation cost becomes disadvantageous in industry. On the other hand, the temperature higher than 100° C. is liable to cause deterioration of polyhydroxycarboxylic acid in the course of treatment.

Contact of the organic layer with the aqueous layer can be carried out under atmospheric, reduced or increased pressure. No limitation is put upon the pressure. Contact time is adequately 0.1–24 hours, preferably 0.5–8.0 hours. The contact time less than 0.1 hour leads to unsatisfactory removal of the catalyst in some cases. On the other hand, the contact time exceeding 24 hours results in deterioration of some polyhydroxycarboxylic acids.

The organic layer is brought into contact with the aqueous layer for a sufficient time to pass the catalyst into the aqueous layer and thereafter be separated from the aqueous layer. Separation after contact of the organic and aqueous layers can be adequately carried out by merely allowing the layers to stand. A coalescer, centrifugal separator and other machines for more efficiently separating these layers can also be used.

The separated aqueous layer is removed, and polyhydroxycarboxylic acid is isolated by known processes from the organic layer which is free from the catalyst. The known processes include solvent evaporation from the organic layer and a combination of contact with a lean solvent, precipitation of polyhydroxycarboxylic acid and successive separation by filtration. These processes can provide with ease, polyhydroxycarboxylic acid which contains no catalyst.

The purification process of the invention is characterized by removing the catalyst in polyhydroxycarboxylic acid by bringing the phenol-containing solution of polyhydroxycarboxylic acid into contact with the acidic material. The reason why phenols are effective for removing the catalyst is not clear. It is, however, assumed that the molecular chain is liable to extend by coordinating the hydroxyl group of phenols to polyhydroxycarboxylic acid and contact of the catalyst enveloped by the molecular chain with the acidic material is increased.

According to the purification process of the invention, the catalyst contained in polyhydroxycarboxylic acid can be efficiently removed by simple procedures. It is not always necessary to remove the polyhydroxycarboxylic acid in the form of a solid and to treat the acid in the solid state. The process of the invention can treat polyhydroxycarboxylic acid in a higher concentration as compared with the process described in U.S. Pat. No. 4,960,866 wherein methylene chloride, chloroform and other halogenated hydrocarbons are used as solvents. Consequently, the process of the invention is favorable in industry.

Generally, mechanical strengths, heat resistance, weatherability and other properties of polyhydroxycarboxylic acid greatly depend upon the amount of the catalyst remaining in polyhydroxycarboxylic acid. It is required to have a residual catalyst amount of usually 200 ppm or less, preferably 50 ppm or less. According to the purification process of the invention, the residual amount of the catalyst in polyhydroxycarboxylic acid is 50 ppm or less at the worst, 2 ppm or less under preferred purification conditions. Thus, polyhydroxycarboxylic acid obtained by the purification process of the invention contains substantially no catalyst. As a result, polyhydroxycarboxylic acid of the invention substantially eliminates the above mentioned adverse effect of the residual catalyst on the slow-release drug and can be used for the drug with complete safety. Further, polyhydroxycarboxylic acid of the invention has excellent mechanical properties, heat resistance and weatherability, and thus is stable in a thermoforming stage, can be molded or processed with ease, and can be used for the material of various kinds of films and work pieces.

EXAMPLE

The present invention will be illustrated by way of examples hereinafter. However, these examples and equipment are not intend to limit the scope of the invention.

The molecular weight of polyhydroxycarboxylic acid in the invention was measured by GPC (gel permeation chromatography) using polystyrene as a standard sample.

GPC: Shodex system 11 (manufactured by Showa Denko Co.)

Column: K-805L×2 K-800P (precolumn)

Column temperature: 40° C.

Solvent: Chloroform

Flow rate: 1.0 ml/min

Sample concentration: 3 mg/1 ml

Amount of sample: 10 μl

Synthetic Example 1

(Direct polymerization process)

By heating and stirring 104.2 g of 90% L-lactic acid at 150° C. for 3 hours under reduced pressure of 50 mmHg while distilling water out of the reaction system, 73.2 g of oligomer was obtained. To the oligomer, 0.375 g of tin powder was added and further stirred at 150° C. for 2 hours under reduced pressure of 30 mmHg. Then a Dean Stark trap was mounted, 225 g of diphenyl ether was added, and an azeotropic dehydration reaction was carried out at 130° C. for 1 hour under reduced pressure of 12 mmHg to remove formed water. Thereafter, the Dean Stark trap was disassembled and a tube packed with 50 g of molecular sieve 3A was installed so as to return a distilled solvent to the reaction system after passing through the molecular sieve. The reaction was further carried out at 130° C. for 48 hours under reduced pressure of 15 mmHg. After finishing the reaction, the temperature was decreased to 50° C. to precipitate the polymer. The reaction mass contained 25% of polylactic acid, about 75% of diphenyl éther solvent and 1,250 ppm of tin.

Synthetic Example 2

The reaction mass obtained by Synthetic Example 1 was filtered. Polylactic acid thus obtained was washed with 400 g of isopropyl alcohol and dried at 60° C. for 12 hours under reduced pressure of 200 mmHg to remove the solvent. Polylactic acid white powder obtained was 21.5 g (83% yield). Molecular weight by GPC was 150,000 and tin content was 2,500 ppm.

Synthetic Example 3

(Melt polymerization process)

To a 2,000 ml three necked flask equipped with a condenser, thermometer and stirrer, 1,500 g of 90% L-lactic acid was charged, and a dehydration reaction was carried out at 150° C. for 8 hours while gradually reducing the pressure from atmospheric pressure to 30 mmHg. Zinc powder was added to the reaction mixture and the cyclic dimer of lactic acid (lactide) was fractionated at 200° C. for 4 hours under reduced pressure of 5 mmHg. The yield was 85 mol % based on lactic acid. Lactide thus obtained was recrystallized from ethyl acetate and dried. To thus obtained lactide, 0.1 wt % of stannous octanoate catalyst and 2 wt % of lauryl alcohol molecular weight controller were added for the weight of lactic acid and stirred at 180° C. for 4 hours in a nitrogen atmosphere. After finishing the reaction, polyhydroxycarboxylic acid was discharged from the bottom of the reactor in the form of a strand. The strand obtained was quickly cooled and cut into pellets with a pelletizer. The pellets of polyhydroxycarboxylic aced had a molecular weight of 190,000 by GPC and a tin content of 1,100 ppm.

Example 1

Polylactic acid powder which was prepared in Synthetic Example 2 and had a molecular weight of 150,000 was used for the raw material. A solution having a polymer concentration of 10% was obtained by dissolving 10 g of the polylactic acid powder in 90 g of m-cresol. To the homogeneous solution, 100 g of a 3% aqueous hydrochloric acid solution was added and stirred for 30 minutes at room temperature. After stirring, the mixture was allowed to stand for 15 minutes to separate into an aqueous layer and organic layer. The organic layer was mixed with 100 g of water, stirred, allowed to stand, and the organic layer was separated. These successive procedures were repeated three times. Tin content of the organic layer was reduced to 2 ppm or less. The solvent was removed from the organic layer at 130° C. under reduced pressure of 15 mmHg. Thereafter the residue was heated to 180° C. and molten product was discharged from the bottom of the reaction in the form of a strand. The strand was quickly cooled and cut into pellets with a pelletizer.

The polylactic acid pellets obtained had a tin content of 2 ppm or less and a molecular weight of 148,000. Thus, almost no reduction was found on the molecular weight polyhydroxycarboxylic acid raw. Results are summarized in Table 1.

Examples 2–24

The same procedures as described in Example 1 were carried out except that polyhydroxycarboxylic acid raw material, processing solution (aqueous solution containing the acidic material) and process conditions were changed as shown in Table 1. Results are summarized in Table 1.

Tin in the polyhydroxycarboxylic acid so obtained was almost perfectly removed and its content was 20 ppm or less. And almost no reduction was found on the molecular weight compared to the raw polyhydroxycarboxylic acid.

Comparative Examples 1–15

The same procedures as described in Example 1 were carried out except that polyhydroxycarboxylic acid raw material, processing solution (aqueous solution containing the acidic material) and process conditions were changed so shown in Table 2. Results are summarized in Table 2.

When halogenated hydrocarbons (chloroform, ethylene dichloride and dichloromethane) which contain no phenols were used as solvents, a large amount of the tin catalyst remained and the molecular weight of polyhydroxycarboxylic acid decreased in all cases except Comparative Example 4 where polyhydroxycarboxylic acid had a concentration of 1%.

TABLE 1-1

| Example No. | Polymer[6] Monomer[1] (Synthetic Example No.) | Sn content (ppm) | Mw (× 10$^4$) | Morphology | Solvent concentration of Polymer (wt %) | Acidic material Amount of solution (fold) | Mole (for 100 g polymer) | Contact condition temperature (°C.) | time (hr) | Result Sn-content (ppm) | Mw (× 10$^4$) |
|---|---|---|---|---|---|---|---|---|---|---|---|
| 1 | L[2] (2) | 2500 | 15.0 | Powder | m-cresol (10) | 3% HCl[7] (1) | 0.82 | 30 | 0.5 | 2≧ | 14.8 |
| 2 | ↑ | ↑ | ↑ | ↑ | p-cresol (10) | ↑ | ↑ | ↑ | ↑ | 2≧ | 14.4 |
| 3 | ↑ | ↑ | ↑ | ↑ | o-cresol (10) | ↑ | ↑ | ↑ | ↑ | 2≧ | 14.5 |
| 4 | ↑ | ↑ | ↑ | ↑ | phenol (10) | ↑ | ↑ | ↑ | ↑ | 2≧ | 14.7 |
| 5 | ↑ | ↑ | ↑ | ↑ | 2,4-xylenol (10) | ↑ | ↑ | ↑ | ↑ | 8 | 14.3 |
| 6 | ↑ | ↑ | ↑ | ↑ | o-chlorophenol (10) | ↑ | ↑ | ↑ | ↑ | 11 | 14.5 |
| 7 | ↑ | ↑ | ↑ | ↑ | p-chlorophenol (10) | ↑ | ↑ | ↑ | ↑ | 11 | 14.5 |
| 8 | ↑ | ↑ | ↑ | ↑ | m-cresol (15) | 3% HCl (1.5) | ↑ | ↑ | ↑ | 6 | 14.8 |
| 9 | ↑ | ↑ | 9.8 | ↑ | m-cresol (20) | 3% HCl (2.0) | ↑ | ↑ | ↑ | 16 | 9.4 |

TABLE 1-2

| Example No. | Polymer[6] Monomer[1] (Synthetic Example No.) | Sn content (ppm) | Mw (× 10⁴) | Morphology | Solvent concentration of Polymer (wt %) | Acidic material Amount of solution | Mole (for 100 g polymer) (fold) | Contact condition temperature (°C.) | time (hr) | Result Sn-content (ppm) | Mw (× 10⁴) |
|---|---|---|---|---|---|---|---|---|---|---|---|
| 10 | L[2] (1) | 1250 | 15.0 | Raction mass | m-cresol (10) | 3% HCl (1) | 0.82 | 30 | 0.5 | 2≧ | 15.0 |
| 11 | ↑ | ↑ | ↑ | ↑ | 2,4-xylenol (10) | ↑ | ↑ | ↑ | ↑ | 10 | 14.7 |
| 12 | L[2] (2) | 2500 | ↑ | Powder | m-cresol (10) | 5% H₂SO₄[8] (1) | 0.51 | ↑ | ↑ | 2≧ | 15.0 |
| 13 | ↑ | ↑ | ↑ | ↑ | ↑ | 5% HNO₃[9] (1) | 0.82 | ↑ | ↑ | 7 | 14.5 |
| 14 | ↑ | ↑ | ↑ | ↑ | ↑ | 5% H₃PO₄[10] (1) | 0.52 | ↑ | ↑ | 8 | 14.8 |
| 15 | ↑ | ↑ | ↑ | ↑ | ↑ | 3% HCl (1) | 0.82 | 100 | ↑ | 2≧ | 13.5 |
| 16 | ↑ | ↑ | ↑ | ↑ | ↑ | ↑ | ↑ | 20 | ↑ | 10 | 15.0 |
| 17 | ↑ | ↑ | ↑ | ↑ | ↑ | ↑ | ↑ | 30 | 8.0 | 2≧ | 14.8 |

TABLE 1-3

| Example No. | Polymer[6] Monomer[1] (Synthetic Example No.) | Sn content (ppm) | Mw (× 10⁴) | Morphology | Solvent concentration of Polymer (wt %) | Acidic material Amount of solution | Mole (for 100 g polymer) (fold) | Contact condition temperature (°C.) | time (hr) | Result Sn-content (ppm) | Mw (× 10⁴) |
|---|---|---|---|---|---|---|---|---|---|---|---|
| 18 | D[3]/L = 1/9 (2) | 2600 | 14.1 | Powder | m-cresol (10) | 3% HCl (1) | 0.82 | 30 | 0.5 | 2≧ | 13.7 |
| 19 | D[3]/L = 1/9 (1) | 1350 | ↑ | Raction mass | ↑ | ↑ | ↑ | ↑ | ↑ | 2≧ | 13.9 |
| 20 | L/Gly[4] = 9/1 (1) | 1200 | 16.3 | ↑ | ↑ | ↑ | ↑ | ↑ | ↑ | 2≧ | 15.9 |
| 21 | L/But[5] = 9/1 (1) | 1300 | 13.8 | ↑ | ↑ | ↑ | ↑ | ↑ | ↑ | 2≧ | 13.2 |
| 22 | L (2) | 2500 | 15.0 | Powder | m-cresol/ chloroform[11] | ↑ | ↑ | ↑ | ↑ | 2≧ | 14.8 |
| 23 | ↑ | ↑ | ↑ | ↑ | m-cresol/ chloroform[12] | 3% HCl (1.5) | ↑ | ↑ | ↑ | 20 | 14.4 |
| 24 | L (3) | 1100 | 19.0 | Pellet | m-cresol (10) | 3% HCl (1) | ↑ | ↑ | ↑ | 2≧ | 18.8 |

TABLE 2-1

| Com. Example No. | Polymer[6] Monomer[1] (Synthetic Example No.) | Sn content (ppm) | Mw (× 10⁴) | Morphology | Solvent concentration of Polymer (wt %) | Acidic material Amount of solution | Mole (for 100 g polymer) (fold) | Contact condition temperature (°C.) | time (hr) | Result Sn-content (ppm) | Mw (× 10⁴) |
|---|---|---|---|---|---|---|---|---|---|---|---|
| 1 | L (2) | 2500 | 15.0 | Powder | chloroform (10) | 3% HCl (1) | 0.82 | 30 | 0.5 | 450 | 12.8 |
| 2 | ↑ | ↑ | ↑ | ↑ | ethylene di-chloride (10) | ↑ | ↑ | ↑ | ↑ | 520 | 12.7 |
| 3 | ↑ | ↑ | ↑ | ↑ | dichloro-methane (10) | ↑ | ↑ | ↑ | ↑ | 430 | 11.5 |
| 4 | ↑ | ↑ | ↑ | ↑ | chloroform (1) | 3% HCl (0.1) | ↑ | ↑ | ↑ | 2≧ | 14.8 |
| 5 | ↑ | ↑ | ↑ | ↑ | chloroform (10) | 10% HCl (1) | 2.73 | ↑ | ↑ | 610 | 4.1 |
| 6 | L (1) | 1250 | ↑ | Reaction mass | ↑ | 3% HCl (1) | 0.82 | ↑ | ↑ | 860 | 13.0 |
| 7 | ↑ | ↑ | ↑ | ↑ | ethylene di-chloride (10) | ↑ | ↑ | ↑ | ↑ | 940 | 12.7 |
| 8 | L (2) | 2500 | ↑ | Powder | chloroform (10) | 5% H₂SO₄ (1) | 0.51 | ↑ | ↑ | 530 | 11.6 |

TABLE 2-1-continued

| Com. Example No. | Polymer[6] Monomer[1] (Synthetic Example No.) | Sn content (ppm) | Mw (× 10$^4$) | Morphology | Solvent concentration of Polymer (wt %) | Acidic material Amount of solution | Mole (for 100 g polymer) | Contact condition temperature (°C.) | time (hr) | Result Sn-content (ppm) | Mw (× 10$^4$) |
|---|---|---|---|---|---|---|---|---|---|---|---|
| 9 | ↑ | ↑ | ↑ | ↑ | ↑ | 5% HNO$_3$ (1) | 0.82 | ↑ | ↑ | 730 | 13.0 |

TABLE 2-2

| Com. Example No. | Polymer[6] Monomer[1] (Synthetic Example No.) | Sn content (ppm) | Mw (× 10$^4$) | Morphology | Solvent concentration of Polymer (wt %) | Acidic material Amount of solution | Mole (for 100 g polymer) | Contact condition temperature (°C.) | time (hr) | Result Sn-content (ppm) | Mw (× 10$^4$) |
|---|---|---|---|---|---|---|---|---|---|---|---|
| 10 | L (2) | 2500 | 15.0 | Powder | chloroform (10) | 5% H$_3$PO$_4$ (1) | 0.52 | 30 | 0.5 | 640 | 13.6 |
| 11 | D/L = 1/9 (2) | 2600 | 14.1 | ↑ | ↑ | 3% HCl (1) | 0.82 | ↑ | ↑ | 860 | 13.1 |
| 12 | D/L = 1/9 (1) | 1350 | ↑ | Reaction mass | ↑ | ↑ | ↑ | ↑ | ↑ | 760 | 13.2 |
| 13 | L/Gly = 9/1 (1) | 1200 | 16.3 | ↑ | ↑ | ↑ | ↑ | ↑ | ↑ | 680 | 14.0 |
| 14 | L/But = 9/1 (1) | 1300 | 13.8 | ↑ | ↑ | ↑ | ↑ | ↑ | ↑ | 790 | 10.5 |
| 15 | L (3) | 1100 | 19.0 | Pellet | ↑ | ↑ | ↑ | ↑ | ↑ | 880 | 14.9 |

Note:
[1]Mononer: Hydroxycarboxylic acid raw material
[2]L: L-lactic acid
[3]D: D-lactic acid
[4]Gly: Glycolic acid
[5]But: Hydroxybutyric acid
[6]Polymer: Polyhydroxycarboxylic acid
[7]HCl: Aqueous hydrochloride acid solution
[8]H$_2$SO$_4$: Aqueous sulfuric acid solution
[9]HNO$_3$: Aqueous nitric acid solution
[10]H$_3$PO$_4$: Aqueous phosphoric acid solution
[11]Solvent mixture composed of 50 g m-cresol and 40 g chloroform. Polymer concentration is 10%.
[12]Solvent mixture composed of 1 g m-cresol and 55.5 g chloroform. Polymer concentration is 15%.

What is claimed is:

1. A purification process of polyhydroxycarboxylic acid, comprising dissolving polyhydroxycarboxylic acid in a water-immiscible phenol or an organic solvent containing said water-immiscible phenol, successively bringing the resulting solution into contact with water which contains an acidic material, separating an organic layer from an aqueous layer, and isolating polyhydroxycarboxylic acid from the organic layer.

2. The process according to claim 1 wherein the water-immiscible phenol is a single compound or a mixture of the same which is selected from m-cresol, p-cresol, o-cresol, phenol, 2,4-xylenol, o-chlorophenol or p-chlorophenol.

3. The process according to claim 1 wherein the amount of the water-immiscible phenol is 0.1–20 times by weight of the polyhydroxycarboxylic acid and the polyhydroxycarboxylic acid has a concentration of 1–30% by weight in the organic solvent.

4. The process according to claim 1 wherein the amount of the water-immiscible phenol is 0.1–9 times by weight of the polyhydroxycarboxylic acid and the polyhydroxycarboxylic acid has a concentration of 5–15% by weight in the organic solvent.

* * * * *